(12) United States Patent
Nagae

(10) Patent No.: US 11,911,828 B2
(45) Date of Patent: Feb. 27, 2024

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Shin Nagae, Yasu (JP)

(73) Assignee: KYOCERA Corporation, Kyoto (JP)

( * ) Notice: Subject to any disclaimer, the term of this patent is extended or adjusted under 35 U.S.C. 154(b) by 228 days.

(21) Appl. No.: 17/041,678

(22) PCT Filed: Mar. 27, 2019

(86) PCT No.: PCT/JP2019/013270
§ 371 (c)(1),
(2) Date: Sep. 25, 2020

(87) PCT Pub. No.: WO2019/189406
PCT Pub. Date: Oct. 3, 2019

(65) Prior Publication Data
US 2021/0008637 A1    Jan. 14, 2021

(30) Foreign Application Priority Data
Mar. 27, 2018 (JP) .................................. 2018-060632

(51) Int. Cl.
*B23B 27/14* (2006.01)

(52) U.S. Cl.
CPC .......... *B23B 27/145* (2013.01); *B23B 27/143* (2013.01); *B23B 2200/0447* (2013.01);
(Continued)

(58) Field of Classification Search
CPC ........ B23B 2200/081; B23B 2200/321; B23B 2200/201; B23B 2200/204;
(Continued)

(56) References Cited

U.S. PATENT DOCUMENTS 4,359,300 A * 11/1982 Hazra .................... B23B 27/143
407/114
4,859,122 A * 8/1989 Patterson .............. B23B 27/143
407/116
(Continued)

FOREIGN PATENT DOCUMENTS

EP          1967304 A2 *  9/2008 ........... B23B 27/143
JP        54-113784 U      8/1979
(Continued)

*Primary Examiner* — Ryan Rufo
(74) *Attorney, Agent, or Firm* — Volpe Koenig

(57) ABSTRACT

A cutting insert may include a first surface, a second surface, a third surface and a cutting edge. The first surface may include a corner, a first side, a first inclined surface located along the corner, a second inclined surface located further inside than the first inclined surface, a third inclined surface located along the first side, a fourth inclined surface located further inside the first surface than the third inclined surface, and a protruded part located further inside than the second inclined surface and the fourth inclined surface. An inclination angle of the protruded part may be smaller than an inclination angle of the second inclined surface in a cross section along a bisector of the corner. The inclination angle of the protruded part may be larger than a third inclination angle in a cross section orthogonal to the first side.

8 Claims, 16 Drawing Sheets

(52) U.S. Cl.
CPC ... *B23B 2200/286* (2013.01); *B23B 2200/321* (2013.01); *B23B 2200/3645* (2013.01)

(58) Field of Classification Search
CPC .......... B23B 2200/208; B23B 2200/32; B23B 2200/286; B23B 2200/24; B23B 27/005; B23B 27/02; B23B 27/143; B23B 27/145; B23B 27/141; B23B 27/1607; B23B 27/1611; B23B 27/1603; B23B 27/1622; B23B 27/164; B23B 27/1651
See application file for complete search history.

(56) References Cited

U.S. PATENT DOCUMENTS

| | | | | |
|---|---|---|---|---|
| 5,116,167 | A | * | 5/1992 | Niebauer .............. B23B 27/143 D15/139 |
| 5,122,017 | A | * | 6/1992 | Niebauer .............. B23B 27/143 407/115 |
| 5,193,947 | A | * | 3/1993 | Bernadic .............. B23B 27/143 D15/139 |
| 8,342,779 | B2 | * | 1/2013 | Kobayashi ............ B23B 27/143 407/113 |
| 9,409,237 | B2 | * | 8/2016 | Majima ................ B23B 27/1607 |
| 9,796,024 | B2 | * | 10/2017 | Nagarajan ............. B23B 27/143 |
| 10,040,125 | B2 | * | 8/2018 | Matsuda ................ B23B 27/143 |
| 10,220,448 | B2 | * | 3/2019 | Sakai .................... B23B 27/143 |
| 10,286,455 | B2 | * | 5/2019 | Tomoda ................. B23B 27/20 |
| 2010/0275749 | A1 | * | 11/2010 | Kobayashi ............ B23B 27/143 83/13 |
| 2012/0198973 | A1 | | 8/2012 | Schleinkofer et al. |
| 2013/0236257 | A1 | * | 9/2013 | Nada ................... B23B 27/1607 407/114 |

FOREIGN PATENT DOCUMENTS

| | | | |
|---|---|---|---|
| JP | 59-136205 U | | 9/1984 |
| JP | 61-020204 U | | 2/1986 |
| JP | 62-121004 U | | 7/1987 |
| JP | 2003-275907 A | | 9/2003 |
| JP | 2007-175788 A | | 7/2007 |
| JP | 2013-505845 A | | 2/2013 |
| KR | 20080008530 A | * | 1/2008 |
| KR | 20100079401 A | * | 7/2010 |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2019/013270, filed on Mar. 27, 2019, which claims priority to Japanese Application No. 2018-060632 filed on Mar. 27, 2018, which is entirely incorporated herein by reference.

TECHNICAL FIELD

The present disclosure generally relates to cutting inserts for use in a cutting process. Specifically, the present disclosure relates to cutting inserts for use in a turning process.

BACKGROUND

For example, a cutting insert (indexable insert) is discussed in Japanese Unexamined Patent Application Publication No. 2007-175788 (Patent Document 1) as a cutting insert for use in a cutting process of a workpiece, such as metal. Patent Document 1 discusses the cutting insert including a first rake surface, a second rake surface and an upright wall surface.

SUMMARY

A cutting insert in a non-limiting embodiment may include a first surface, a second surface, a third surface, a cutting edge, a central axis and an imaginary plane. The second surface may be located on a side opposite to the first surface. The third surface may be located between the first surface and the second surface. The cutting edge may be located on an intersection of the first surface and the third surface. The central axis may pass through a center of the first surface and a center of the second surface. The imaginary plane may be located between the first surface and the second surface and may be orthogonal to the central axis.

The first surface may include a corner, a first side, a first inclined surface, a second inclined surface, a third inclined surface, a fourth inclined surface and a protruded part. The first side may be extended from the corner. The first inclined surface may be located along the corner and may be closer to the imaginary plane at a first inclination angle as going away from the corner. The second inclined surface may be located further inside the first surface than the first inclined surface and may be closer to the imaginary plane at a second inclination angle as going away from the corner. The third inclined surface may be located along the first side and may be closer to the imaginary plane at a third inclination angle as going away from the first side. The fourth inclined surface may be located further inside the first surface than the third inclined surface and may be closer to the imaginary plane at a fourth inclination angle as going away from the first side. The protruded part may be located further inside the first surface than the second inclined surface and the fourth inclined surface. The protruded part may be located away from the imaginary plane at a fifth inclination angle as going away from the corner. The protruded part may be located away from the imaginary plane at a sixth inclination angle as going away from the first side.

The second inclination angle may be larger than the first inclination angle. The fourth inclination angle may be larger than the third inclination angle. The fifth inclination angle may be smaller than the second inclination angle in a cross section that is orthogonal to the imaginary plane and along a bisector of the corner. The sixth inclination angle may be larger than the third inclination angle in a cross section orthogonal to the first side.

DETAILED DESCRIPTION

Figure 1:
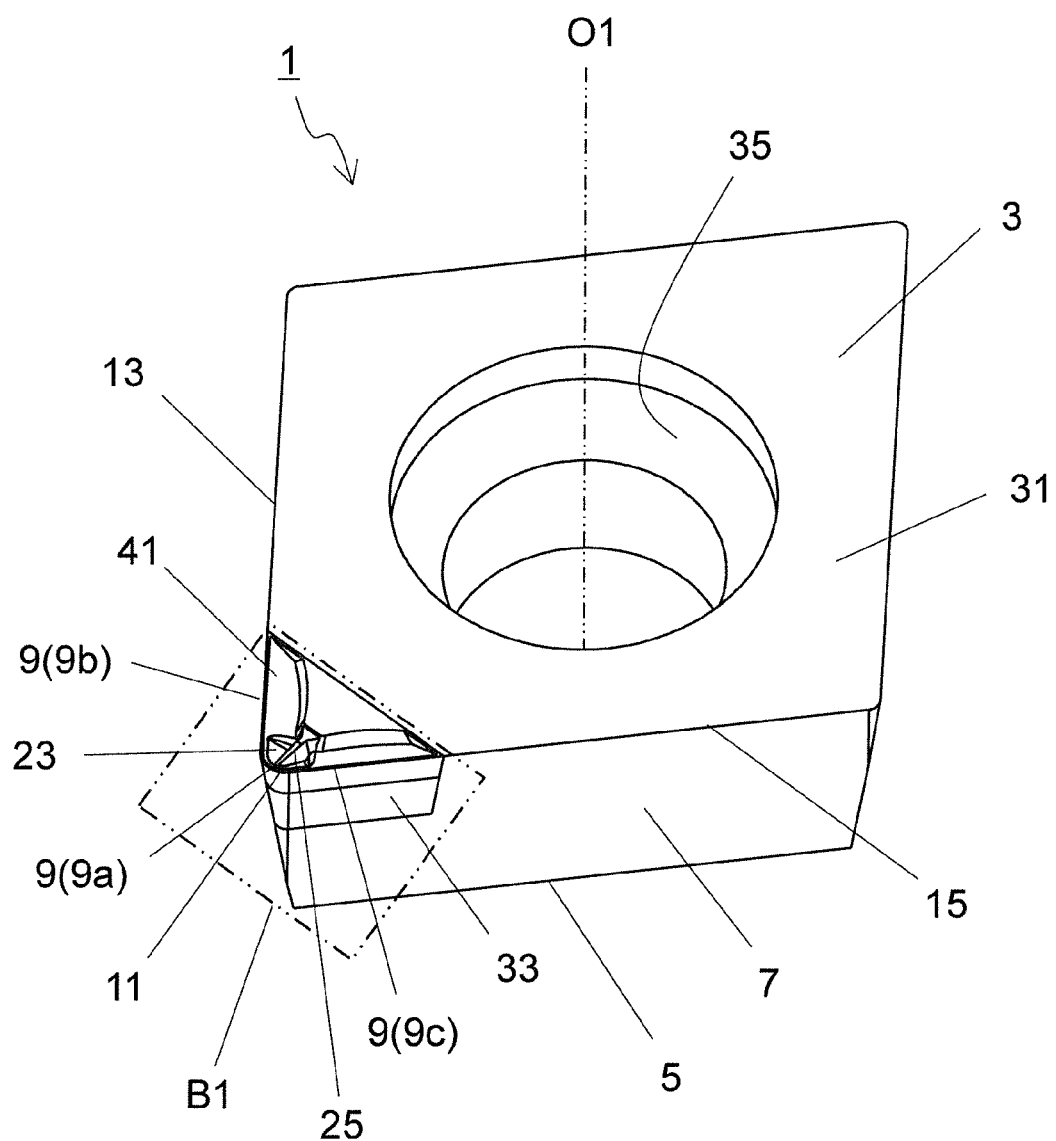
FIG. 1 is a perspective view illustrating a cutting insert in non-limiting embodiments of the present disclosure.

An inclination angle of the upright wall surface may be relatively large in the cutting insert described in Patent Document 1. This may cause a situation where chips become less likely to flow in, for example, low-cutting depth machining using only corners as a cutting edge. Hence, there has been a need for a cutting insert that achieves good chip discharge both in the low-cutting depth machining and high-cutting depth machining.

Cutting inserts 1 (hereinafter also referred to simply as "inserts 1") in a plurality of non-limiting embodiments may be described in detail below with reference to the drawings. For the sake of description, the drawings referred to in the following illustrate, in simplified form, only main members necessary for describing the non-limiting embodiments. The inserts 1 may therefore be capable of including any arbitrary structural member not illustrated in the drawings referred to. Dimensions of the members in each of the drawings faithfully may represent neither dimensions of actual structural members nor dimensional ratios of these members.

<Cutting Inserts>

The insert 1 in non-limiting embodiments of the present disclosure may include a first surface 3 (an upper surface in FIG. 1), a second surface 5 (a lower surface in FIG. 1), a third surface 7 (a side surface in FIG. 1), a cutting edge 9, a central axis O1 and an imaginary plane S. The second surface 5 may be located on a side opposite to the first surface 3.

The third surface 7 may be located between the first surface 3 and the second surface 5. The cutting edge 9 may be located on an intersection of the first surface 3 and the third surface 7. The central axis O1 may pass through a center of the first surface 3 and a center of the second surface 5. The imaginary plane S may be located between the first surface 3 and the second surface 5, and may be orthogonal to the central axis O1.

The first surface 3 may have a polygonal shape, and the insert 1 may have a polygonal plate shape. The first surface 3 may have a quadrangular shape, specifically a rhomboidal shape as in a non-limiting embodiment illustrated in FIG. 1. The first surface 3 may have, for example, a rectangular shape or a parallelogram shape, instead of the rhomboidal shape. Alternatively, the first surface 3 may have a triangular shape, pentagonal shape or hexagonal shape, instead of the rectangular shape.

If the first surface 3 has the rhomboidal shape as in the non-limiting embodiment illustrated in FIG. 1, the first surface 3 may include two corners having an acute angle and two corners having an obtuse angle. The first surface 3 may have four sides. Specifically, one of the corners having the acute angle may be a first corner 11, and two sides extended from the first corner 11 may be a first side 13 and a second side 15. In other words, the first corner 11 may be located between the first side 13 and the second side 15 on an outer peripheral edge of the first surface 3.

As used here, the polygonal shape may not denote a strict polygonal shape. For example, the four corners of the first surface 3 may have a shape rounded and protruded outward in a plan view of the first surface 3. For example, the four corners may have an outwardly protruded circular arc shape.

Shapes of the four sides are not individually limited to a strict straight line shape in the plan view of the first surface 3. These sides may be individually a slightly outwardly protruded shape or a slightly recessed shape in the plan view of the first surface 3.

Similarly to the first surface 3, the second surface 5 may have a polygonal shape. The second surface 5 may have a quadrangular shape, such as a rhombus shape as in the first surface 3 illustrated in FIG. 1. The third surface 7 may include four flat surfaces that are approximately flat, and four curved surfaces for connecting these flat surfaces as in the non-limiting embodiment illustrated in FIG. 1. The shapes of the first surface 3 and the second surface 5 are not limited to the above.

Dimensions of the insert 1 are not particularly limited. For example, a length of one side of the first surface 3 may be settable to approximately 3-20 mm. A height from the first surface 3 to the second surface 5 may be settable to approximately 5-20 mm.

Figure 2:
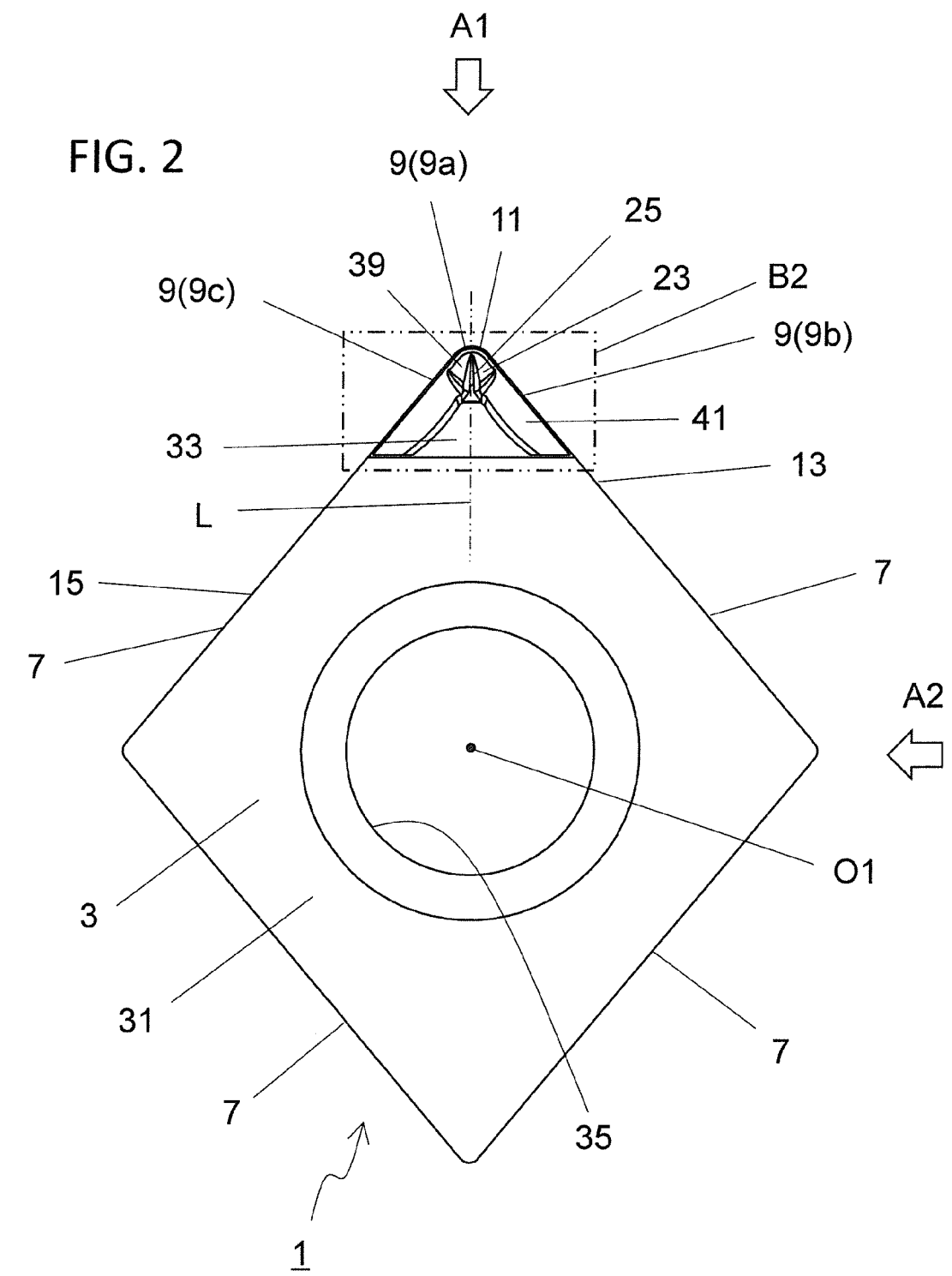
FIG. 2 is a plan view of the cutting insert illustrated in FIG. 1 as viewed from a side of a first surface.
Figure 3:
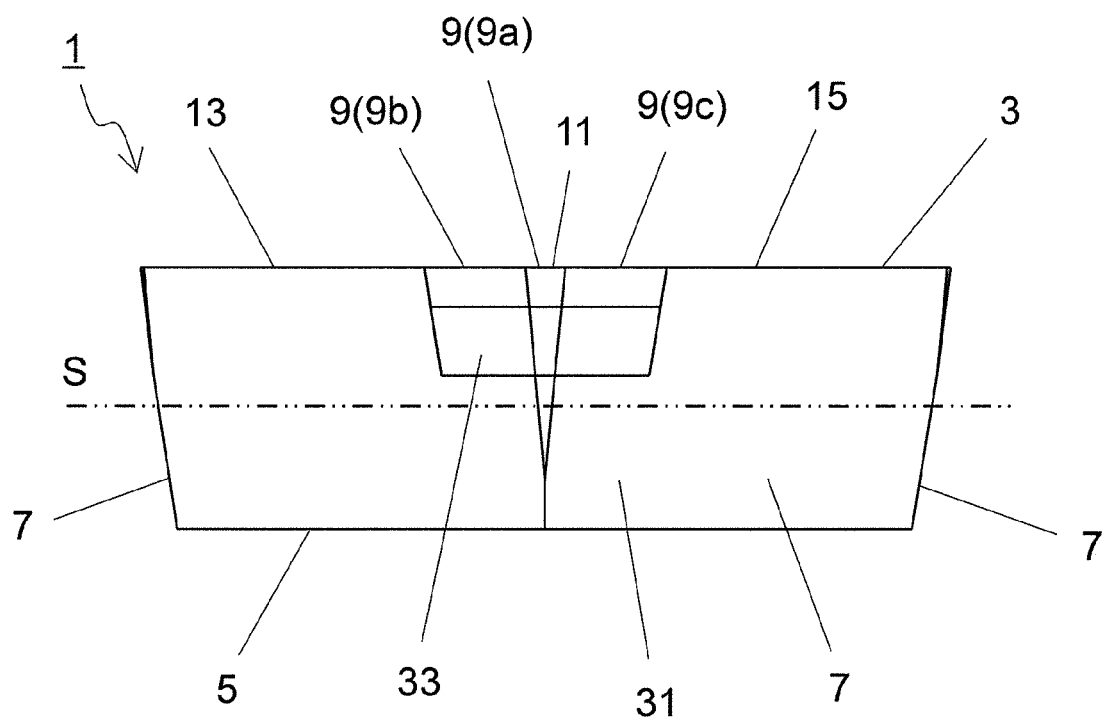
FIG. 3 is a side view of the cutting insert illustrated in FIG. 2 as viewed from an A1 direction.
Figure 4:
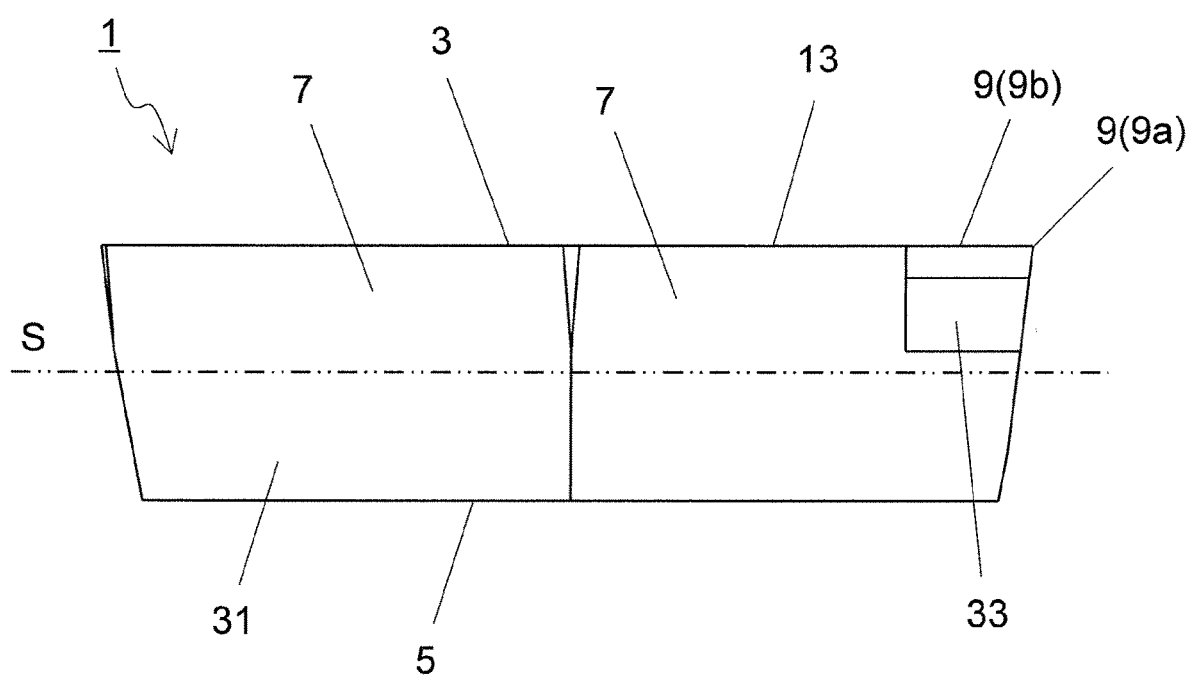
FIG. 4 is a side view of the cutting insert illustrated in FIG. 2 as viewed from an A2 direction.

The cutting edge 9 may be located at an intersection of the first surface 3 and the third surface 7. The cutting edge 9 may be located on the entirety or part of the intersection of the first surface 3 and the third surface 7. The cutting edge 9 may include a corner cutting edge 9a, a first cutting edge 9b and a second cutting edge 9c as in a non-limiting embodiment illustrated in FIG. 2.

The corner cutting edge 9a may be located on the first corner 11. The first cutting edge 9b may be located on the first side 13 and may connect to the corner cutting edge 9a. The second cutting edge 9c may be located at a part of the second side 15 and may connect to the corner cutting edge 9a. As in the non-limiting embodiment illustrated in FIG. 2, the corner cutting edge 9a may have a circular arc shape, and the first cutting edge 9b and the second cutting edge 9c may have a straight line shape in the plan view of the first surface 3.

The first surface 3 may further include a first inclined surface 17, a second inclined surface 19, a third inclined surface 21, a fourth inclined surface 23 and a protruded part 25 as in non-limiting embodiments illustrated in FIGS. 5 to 11. The first inclined surface 17 may be located along the first corner 11. The second inclined surface 19 may be located further inside the first surface 3 than the first inclined surface 17. The third inclined surface 21 may be located along the first side 13. The fourth inclined surface may be located further inside the first surface 3 than the third inclined surface 21.

The protruded part 25 may be located further inside the first surface 3 than the second inclined surface 19 and the fourth inclined surface 23. The first inclined surface 17, the second inclined surface 19, the third inclined surface 21 and the fourth inclined surface 23 may serve as a so-called rake surface. The protruded part 25 may serves as a so-called breaker protrusion.

The second inclined surface 19 may be located away from or in contact with the first inclined surface 17. The second inclined surface 19 may connect to the first inclined surface 17 in the non-limiting embodiment illustrated in FIG. 5. The fourth inclined surface 23 may be located away from or in contact with the third inclined surface 21. The fourth inclined surface 23 may connect to the third inclined surface 21 in the non-limiting embodiment illustrated in FIG. 5.

The protruded part 25 may be located away from or in contact with the second inclined surface 19 and the fourth inclined surface 23. The protruded part 25 may connect to the second inclined surface 19 and the fourth inclined surface 23 in the non-limiting embodiment illustrated in FIG. 5.

Figure 6:
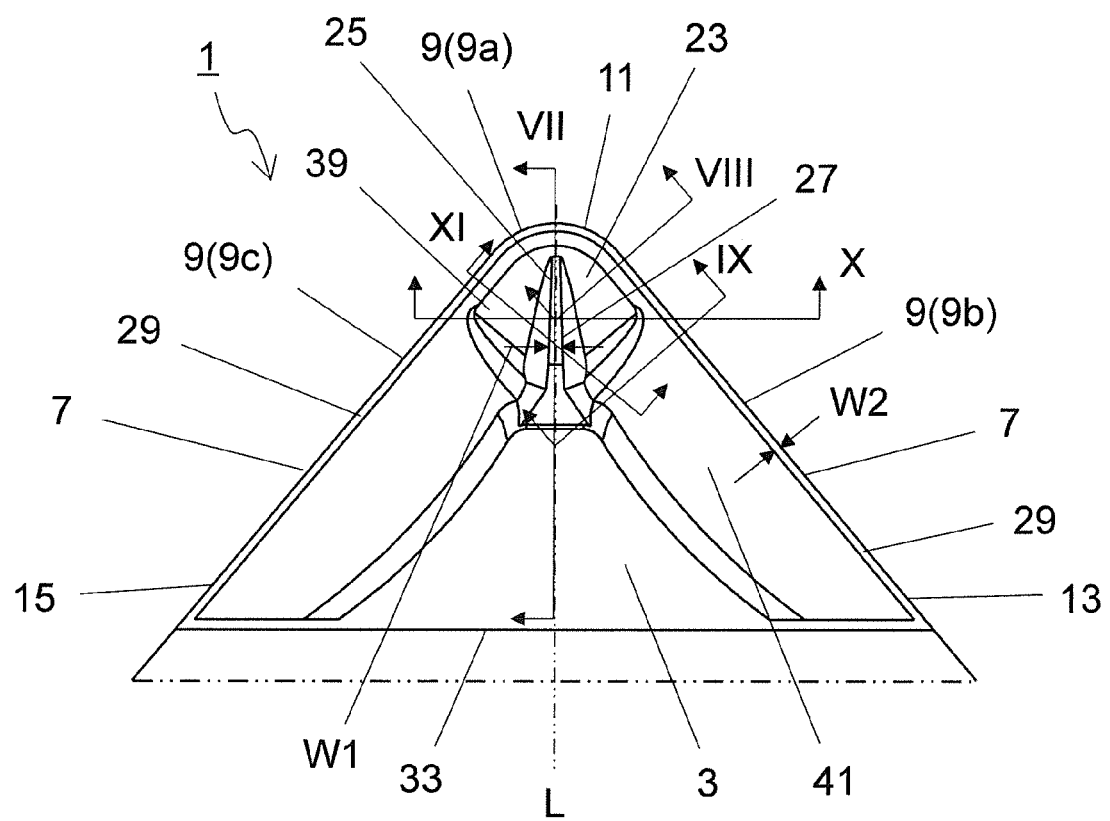
FIG. 6 is an enlarged view of a region B2 illustrated in FIG. 2.
Figure 7:
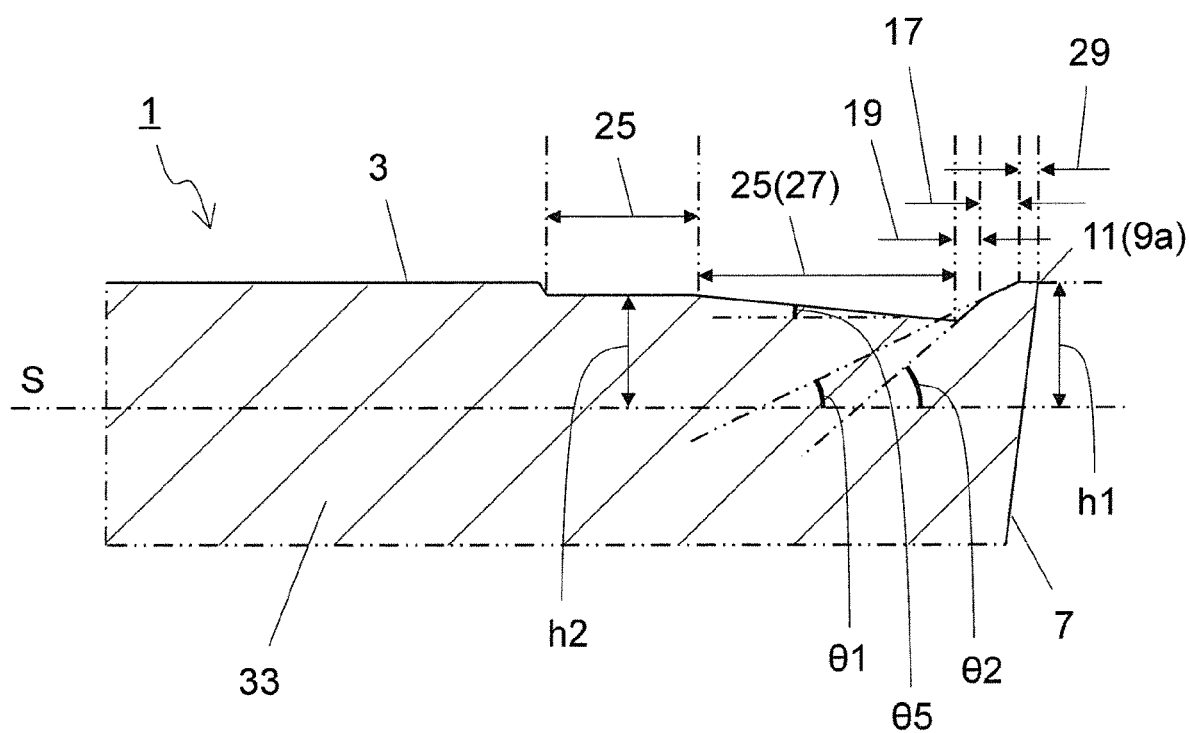
FIG. 7 is a cross-sectional view taken along the line VII-VII in the cutting insert illustrated in FIG. 6.

The first inclined surface 17 may be inclined at a first inclination angle $\theta 1$, or alternatively may be closer to the imaginary plane S as going away from the first corner 11 as illustrated in FIG. 7 that is a cross-sectional view taken along the line VII-VII in FIG. 6. The second inclined surface 19 may be inclined at a second inclination angle $\theta 2$, or alternatively may be closer to the imaginary plane S as going away from the first corner 11 as illustrated in FIG. 7. The second inclination angle $\theta 2$ may be larger than the first inclination angle $\theta 1$.

Figure 8:
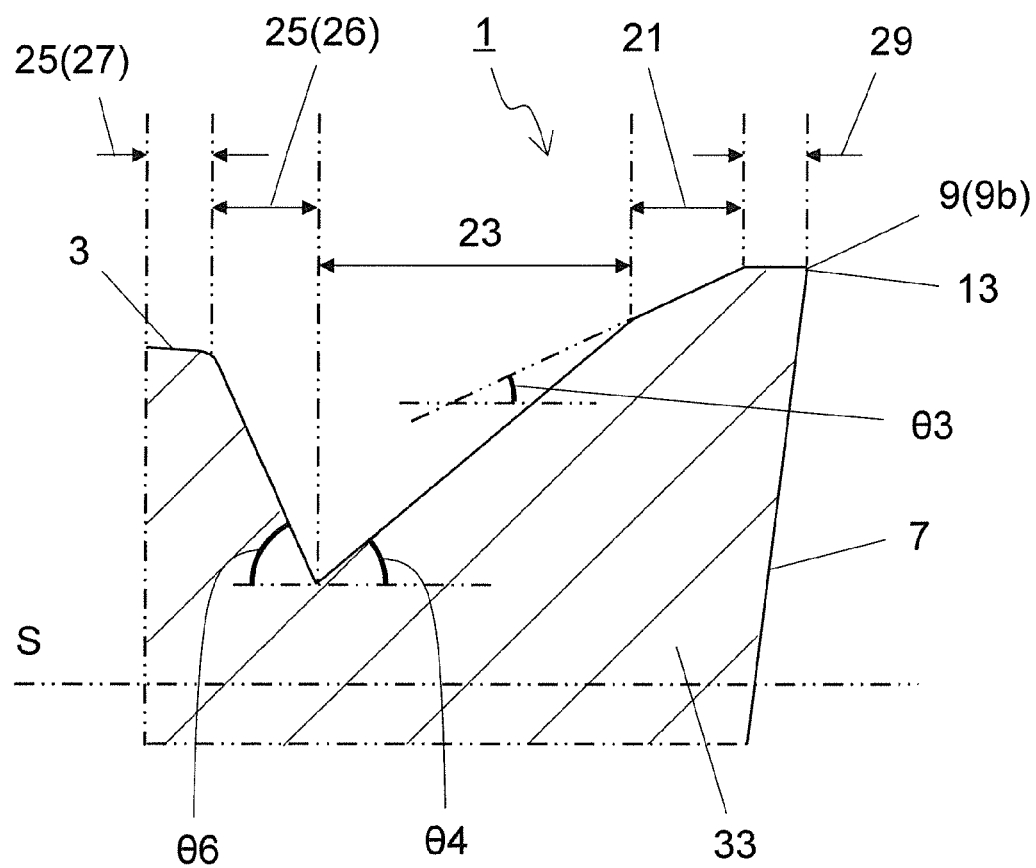
FIG. 8 is a cross-sectional view taken along the line VIII-VIII in the cutting insert illustrated in FIG. 6.
Figure 9:
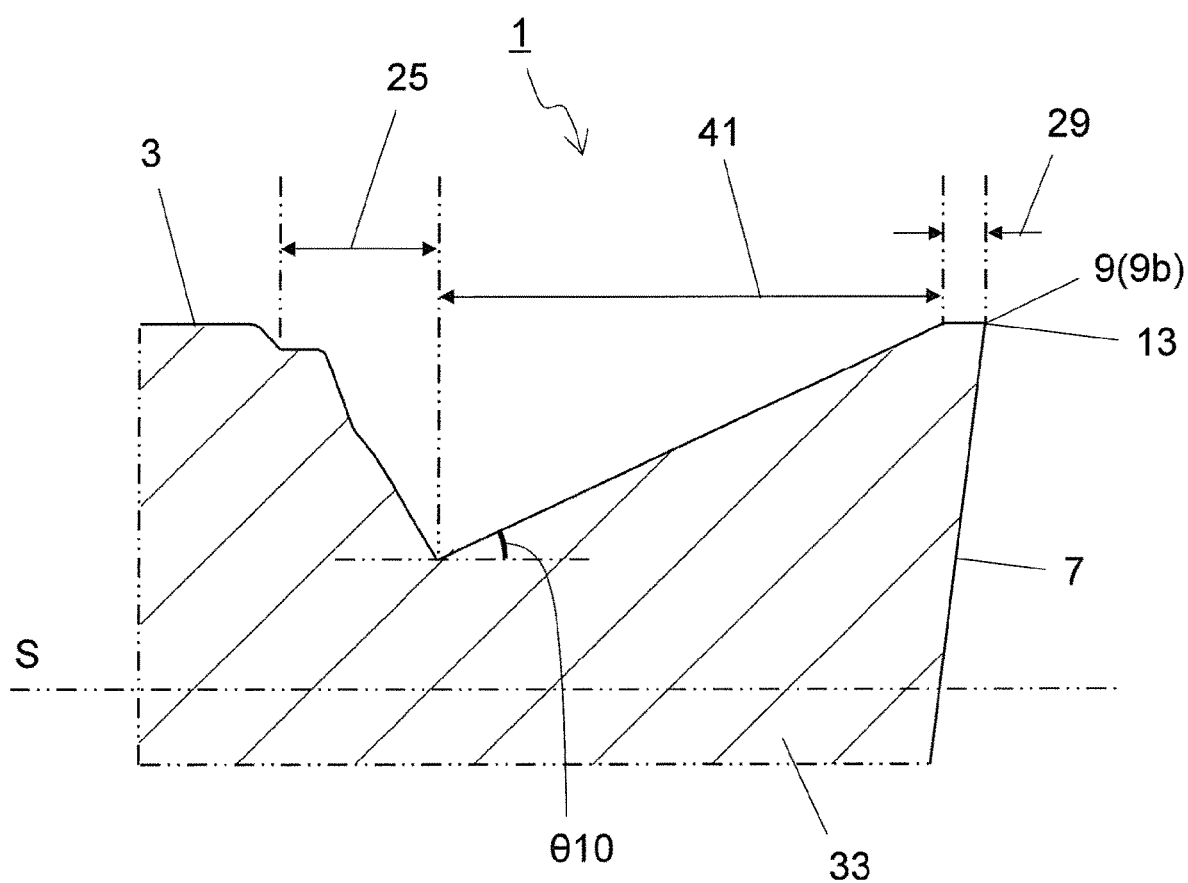
FIG. 9 is a cross-sectional view taken along the line IX-IX in the cutting insert illustrated in FIG. 6.

The third inclined surface 21 may be inclined at a third inclination angle $\theta 3$, or alternatively may be closer to the imaginary plane S as going away from the first side 13 as illustrated in FIG. 8 that is a cross-sectional view taken along the line II-VIII in FIG. 6. The fourth inclined surface 23 may be inclined at a fourth inclination angle $\theta 4$, or alternatively may be closer to the imaginary plane S as going away from the first side 13. The fourth inclination angle $\theta 4$ may be larger than the third inclination angle $\theta 3$.

If the first inclination angle $\theta 1$ is smaller than the second inclination angle $\theta 2$ as described above, it may be easy to ensure a thickness of the insert 1 in the vicinity of the corner cutting edge 9a, thus leading to enhanced durability of the corner cutting edge 9a. If the third inclination angle $\theta 3$ is smaller than the fourth inclination angle $\theta 4$, it may be easy to ensure a thickness of the insert 1 in the vicinity of the first cutting edge 9b, thus leading to enhanced durability of the first cutting edge 9b.

If the second inclination angle θ2 is larger than the first inclination angle θ1, it may be easy to ensure a large space that permits curling of chips generated by the corner cutting edge 9a and then brought into contact with the protruded part 25. Similarly, if the fourth inclination angle θ4 is relatively larger than the third inclination angle θ3, it may be easy to ensure a large space that permits curling of chips generated by the first cutting edge 9b and then brought into contact with the protruded part 25.

The first inclined surface 17, the second inclined surface 19, the third inclined surface 21 and the fourth inclined surface 23 may individually be closer to the imaginary plane S. In other words, these surfaces may be downward inclination as going away from an outer edge of the first surface 3. The protruded part 25 may be located further away from the imaginary plane S. In other words, the protruded part 25 may be upward inclination as going away from the outer edge of the first surface 3.

The protruded part 25 may be located away from the imaginary plane S at a fifth inclination angle θ5 as going away from the first corner 11 as in the non-limiting embodiments illustrated in FIGS. 7 and 8. Alternatively, the protruded part 25 may be located away from the imaginary plane S at the fifth inclination angle θ5 as going away from the first side 13.

The fifth inclination angle θ5 may be smaller than the second inclination angle θ2 in a cross section that is orthogonal to the imaginary plane S and along the bisector L of the first corner 11. The sixth inclination angle θ6 may be larger than the third inclination angle θ3 in a cross section orthogonal to the first side 13.

If the fifth inclination angle θ5 is smaller than the second inclination angle θ2 in the cross section that is orthogonal to the imaginary plane S and along the bisector L of the first corner 11, chips may be easy to flow in, for example, low-cutting depth machining that employs only the corner cutting edge 9a as the cutting edge 9.

Chips may tend to have a small width in the low-cutting depth machining, and a chip flow may tend to become unstable. However, chip clogging may be less likely to occur at the protruded part 25, and the chips may be easy to flow along the protruded part 25 if the fifth inclination angle θ5 at a part of the protruded part 25 which is opposed to the first corner 11 (namely at a fifth inclined surface) is smaller than the second inclination angle θ2 and forms a relatively gentle slope in the above cross section.

If the sixth inclination angle θ6 is larger than the third inclination angle θ3 in a cross section orthogonal to the first side 13, chips may tend to be stably curled in, for example, high-cutting depth machining in which the corner cutting edge 9a and the first cutting edge 9b are used as the cutting edge 9.

Chips may have a large width and the chips may be less likely to be deformed in the high-cutting depth machining. However, chips may tend to be stably curled at the protruded part 25 if the sixth inclination angle θ6 at a part of the protruded part 25 which is opposed to the first cutting edge 9b (namely at a sixth inclined surface) is larger than the third inclination angle θ3 and forms a relatively sharp slope in the above cross section.

Thus, with the insert 1 of non-limiting embodiments of the present disclosure, a good chip discharge may be achievable both in the low-cutting depth machining and the high-cutting depth machining.

The fifth inclination angle θ5 may be smaller than the first inclination angle θ1 in the cross section that is orthogonal to the imaginary plane S and along the bisector L as in the non-limiting embodiment illustrated in FIG. 7. If the fifth inclination angle θ5 is smaller than the first inclination angle θ1 in the above cross section, the fifth inclination angle θ5 at the part of the protruded part 25 which is opposed to the first corner 11 may be a gentler slope. Consequently, chip clogging may be much less likely to occur in the low-cutting depth machining.

The sixth inclination angle θ6 may be larger than the fourth inclination angle θ4 in the cross section orthogonal to the first side 13 as in the non-limiting embodiment illustrated in FIG. 8. If the sixth inclination angle θ6 is larger than the fourth inclination angle θ4 in the above cross section, the sixth inclination angle θ6 at the part of the protruded part 25 which is opposed to the first cutting edge 9b may be a sharper slope. Consequently, chips may tend to be curled more stably in the high-cutting depth machining.

The first inclination angle θ1, the second inclination angle θ2, the third inclination angle θ3, the fourth inclination angle θ4, the fifth inclination angle θ5 and the sixth inclination angle θ6 are individually not limited to a specific value. For example, the first inclination angle θ1 may be settable to 20-30°. The second inclination angle θ2 may be settable to 35-45°. The third inclination angle θ3 may be settable to 20-30°. The fourth inclination angle θ4 may be settable to 35-45°. The fifth inclination angle θ5 may be settable to 3-20°. The sixth inclination angle θ6 may be settable to 40-70°.

The first inclination angle θ1, the second inclination angle θ2, the third inclination angle θ3, the fourth inclination angle θ4, the fifth inclination angle θ5 and the sixth inclination angle θ6 may be kept at a certain value or changed in each of the cross section along the bisector L illustrated in FIG. 7 and the cross section orthogonal to the first side 13 illustrated in FIG. 8.

Figure 11:
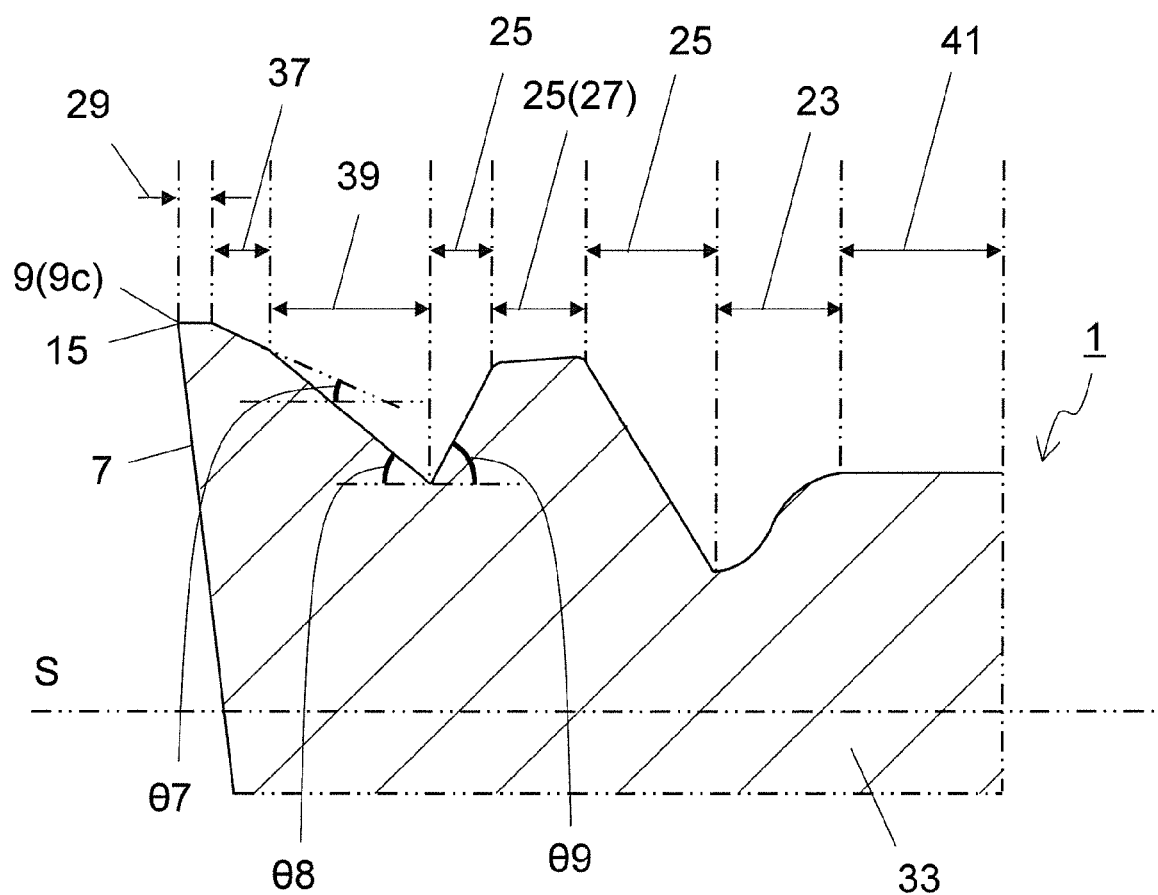
FIG. 11 is a cross-sectional view taken along the line XI-XI in the cutting insert illustrated in FIG. 6.

The fourth inclined surface 23 in a cross section illustrated in FIG. 11 may be illustrated by a convex curved line and a concave curved line, and a value of the fourth inclination angle θ4 may not be constant. If the value of the fourth inclination angle θ4 is not constant, a maximum value of an angle in a target cross section may be evaluated as the fourth inclination angle θ4.

This may also be true for the first inclination angle θ1, the second inclination angle θ2, the third inclination angle θ3, the fifth inclination angle θ5 and the sixth inclination angle θ6. That is, maximum values of angles in target cross sections may be respectively evaluated as the first inclination angle θ1, the second inclination angle θ2, the third inclination angle θ3, the fifth inclination angle θ5 and the sixth inclination angle θ6.

A length of the second inclined surface 19 on the bisector L may be smaller than a length of the first inclined surface 17 in the plan view of the first surface 3. A larger cutting load may tend to be applied to the corner cutting edge 9a than to the first cutting edge 9b during a cutting process of a workpiece. However, if the length of the second inclined surface 19 on the bisector L is smaller than the length of the first inclined surface 17, it may be easy to ensure a large width of a part of the first inclined surface 17 which is located along the corner cutting edge 9a. The corner cutting edge 9a may therefore have enhanced durability.

The protruded part 25 may be extended toward the first corner 11 in the plan view of the first surface 3 as in the non-limiting embodiment illustrated in FIG. 6. Alternatively, the protruded part 25 may be extended along the bisector L in the plan view of the first surface 3 as in the non-limiting embodiment illustrated in FIG. 6.

The protruded part 25 may include a flat front end surface 27 located on the bisector L and inclined so as to be away from the imaginary plane S as going away from the first corner 11. If the protruded part 25 includes the front end surface 27, chips may tend to flow on the flat front end surface 27, for example, during the low-cutting depth machining. This may lead to good chip discharge performance.

A width W1 in a direction orthogonal to the bisector L on the front end surface 27 may increase as going away from the first corner 11 in the plan view of the first surface 3. If the width W1 of a part of the front end surface 27 which is located close to the first corner 11 is relatively small, it may result in a large width in a direction orthogonal to the bisector L at a part of the second inclined surface 19 which is located close to the first corner 11. Consequently, chips may tend to be curled on the second inclined surface 19.

If a width W1 of a part of the front end surface 27 which is located away from the first corner 11 is relatively large, a flow direction of chips passing over the flat front end surface 27 may tend to be controlled in a wide range of the front end surface 27.

The insert 1 may be line symmetric with respect to the bisector L in the plan view of the first surface 3 as in the non-limiting embodiment illustrated in FIG. 6. The cutting edge 9 may include a second cutting edge 9c located on the second side 15.

The first surface 3 may further include a seventh inclined surface 37 and an eighth inclined surface 39 as in the non-limiting embodiment illustrated in FIGS. 6 and 11. The seventh inclined surface 37 may be the inclined surface that is located along the second side 15 and corresponds to the third inclined surface 21. The eighth inclined surface 39 may be the inclined surface that is located further inside the first surface 3 than the seventh inclined surface 37 and corresponds to the fourth inclined surface 23.

The seventh inclined surface 37 may be inclined at a seventh inclination angle θ7, and may be closer to the imaginary plane S as going away from the second side 15 as illustrated in FIG. 11 that is a cross sectional view taken along the line XI-XI in FIG. 6. The eighth inclined surface 39 may be inclined at an eighth inclination angle θ8, and may be closer to the imaginary plane S as going away from the second side 15 as illustrated in FIG. 11.

In the cross section orthogonal to the second side 15 as in the non-limiting embodiment illustrated in FIG. 11, the eighth inclination angle θ8 may be larger than the seventh inclination angle θ7, and an inclination angle (ninth inclination angle θ9) of a part of the protruded part 25 which is opposed to the second side 15 (namely, a ninth inclined surface) may be larger than the seventh inclination angle θ7.

In the above case, chips may tend to be stably curled in the high-cutting depth machining using the corner cutting edge 9a and the second cutting edge 9c as the cutting edge 9. Thus, with the insert 1 in the non-limiting embodiment illustrated in FIG. 6, the chips may tend to be stably curled both in the case of using the corner cutting edge 9a and the first cutting edge 9b as the cutting edge 9, and in the case of using the corner cutting edge 9a and the second cutting edge 9c as the cutting edge 9. That is, the insert 1 in the present disclosure may be usable as a so-called neutral insert 1.

The ninth inclination angle θ9 may be larger than the eighth inclination angle θ8 in a cross section orthogonal to the second side 15 as illustrated in FIG. 11.

Figure 10:
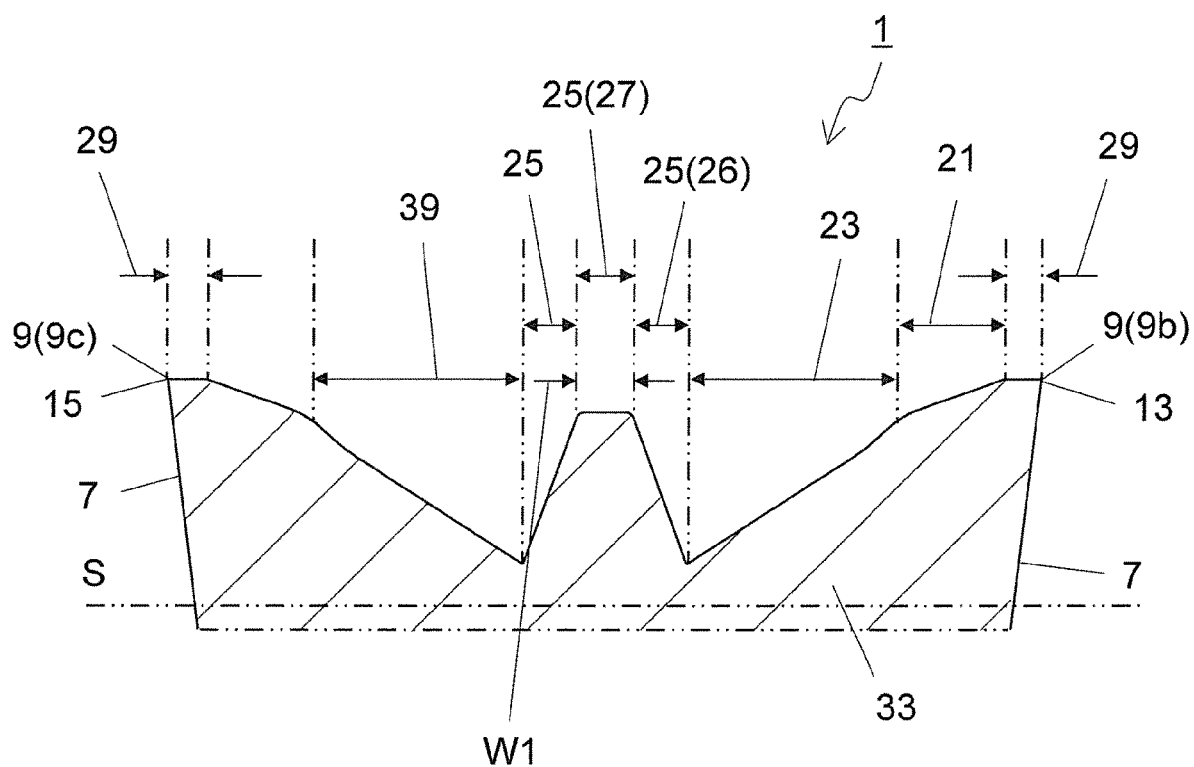
FIG. 10 is a cross-sectional view taken along the line X-X in the cutting insert illustrated in FIG. 6.

The front end surface 27 may be parallel to the imaginary plane S in a cross section orthogonal to the bisector L as in the non-limiting embodiment illustrated in FIG. 10. This may lead to good chip discharge performance in the low-cutting depth machining is attainable both in the case of using the corner cutting edge 9a and the first cutting edge 9b as the cutting edge 9, and in the case of using the corner cutting edge 9a and the second cutting edge 9c as the cutting edge 9. The term "parallel" is not limited to strict parallel but may denote including a slight inclination of approximately 2° to 3°.

A height h1 of the first corner 11 on the basis of the imaginary plane S may be larger than a maximum value of a height h2 of the front end surface 27 on the basis of the imaginary plane S. In other words, the first corner 11 may be located further away from the imaginary plane S than the front end surface 27. This may make it easier to ensure space for chip curling than the cases where at least a part of the front end surface 27 is further away from the imaginary plane S than the first corner 11.

The height h1 of the first corner 11 on the basis of the imaginary plane S may be equal to the height h2 of the front end surface 27 on the basis of the imaginary plane S. This may also make it easier to ensure the space for chip curling. Chips may tend to come into contact with the front end surface 27 even under a high feed rate, while making it easier to ensure the space for chip curling. The chips may therefore tend to be stably curled.

Figure 5:
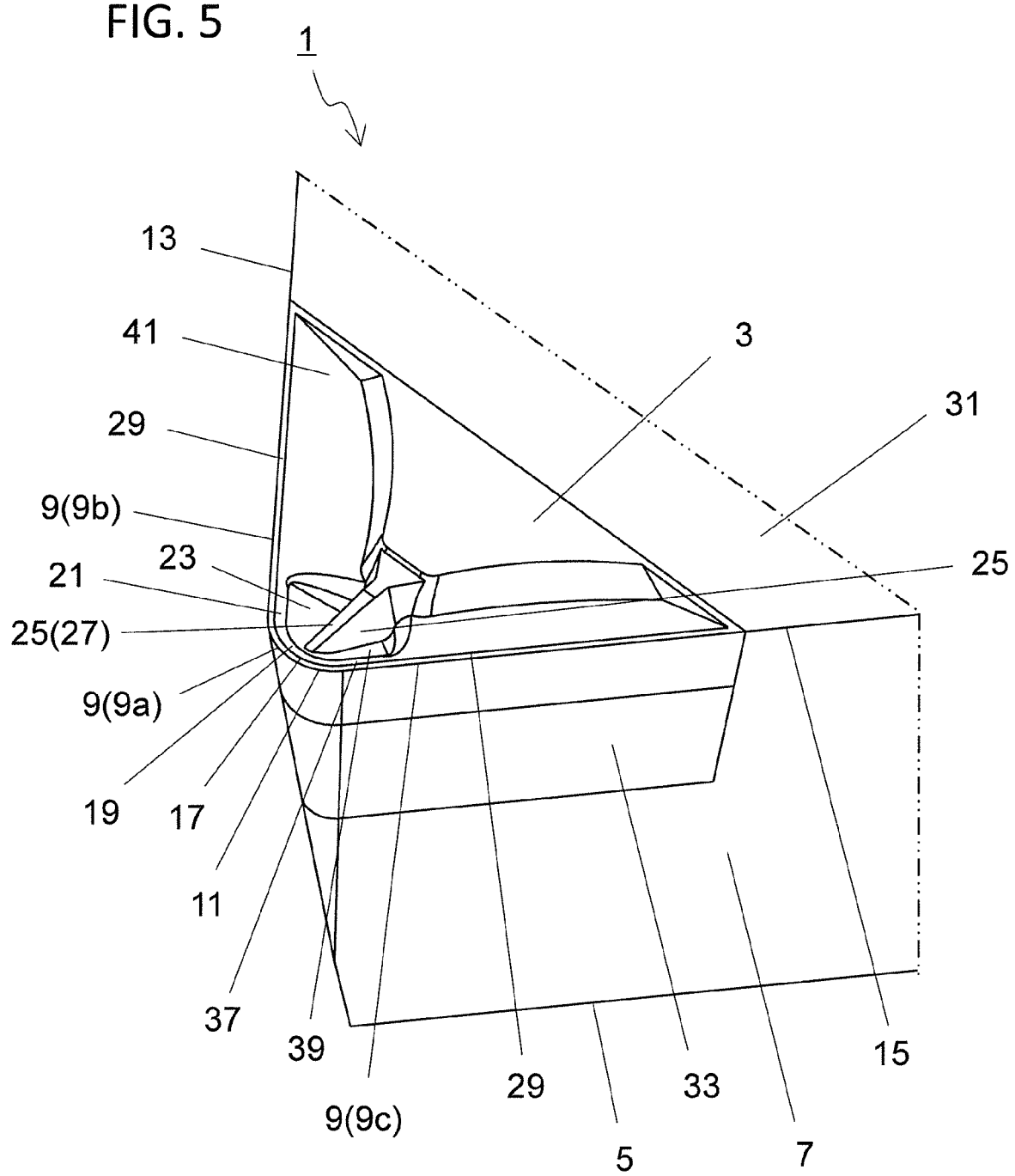
FIG. 5 is an enlarged view of a region B1 illustrated in FIG. 1.

The first surface 3 may further include a tenth inclined surface 41 located along the first side 13 as in the non-limiting embodiment illustrated in FIG. 5. The tenth inclined surface 41 may be further away from the first corner 11 than the third inclined surface 21 and the fourth inclined surface 23. The tenth inclined surface 41 may connect to the third inclined surface 21 and the fourth inclined surface 23.

A part of the fourth inclined surface 23 which is located along the tenth inclined surface 41 may have a convex curvilinear shape in a cross section intersecting with a boundary between the fourth inclined surface 23 and the tenth inclined surface 41 as in the non-limiting embodiment illustrated in FIG. 11. With this configuration, chip clogging may be less likely to occur on the fourth inclined surface 23, for example, if chips move forward on the fourth inclined surface 23 and flow to the tenth inclined surface 41.

The first inclined surface 17 may be located away from the first corner 11, the third inclined surface 21 may be located away from the first side 13, and the seventh inclined surface 37 may be located away from the second side 15 as in the non-limiting embodiment illustrated in FIG. 5. The first corner 11, the first side 13 and the second side 15 may be located away from the first inclined surface 17, the third inclined surface 21 and the seventh inclined surface 37 by interposing a land surface 29 therebetween. Thus, the first surface 3 may further include the land surface 29.

The land surface 29 may be a small width band-shaped region that connects to an outer edge of the first surface 3 and is located along the outer edge of the first surface 3 as illustrated in FIG. 5. If the first surface 3 includes the land surface 29, the cutting edge 9 may have enhanced durability. A width W2 of the land surface 29 may be settable to, for example, approximately 0.01-0.5 mm in the plan view of the first surface 3.

The land surface 29 may be located along the entirety of an outer peripheral edge of the first surface 3, or alternatively may be located along a part of the outer edge of the first surface 3 at which the cutting edge 9 is located. The land surface 29 may be inclined relative to or parallel to the imaginary plane S. The land surface 29 may be parallel to the imaginary plane S in the non-limiting embodiments illustrated in FIG. 7 and the like.

Examples of material of the insert 1 may include cemented carbide, cermet, ceramics, PCD (polycrystal diamond) and cBN (cubic boron nitride).

Examples of composition of the cemented carbide may include WC(tungsten carbide)-Co, WC—TiC(titanium carbide)-Co and WC—TiC—TaC(tantalum carbide)-Co. As used here, WC, TiC and TaC may be hard particles, and Co may be a binding phase. The cermet may be a sintered composite material obtainable by compositing metal into a ceramic component. Examples of the cermet may include compounds composed mainly of TiC or TiN (titanium nitride). The material of the insert 1 is not limited to the above.

The insert 1 may be formed by one or a plurality of members composed of the material exemplified above.

For example, the insert 1 may be formed by a main body 31 and a cutting part 33, and may have a polygonal plate shape as a whole as illustrated in FIG. 1. The main body 31 may have an approximately polygonal plate shape and a part thereof may be cut into a concave shape. The cutting part 33 may be joined to the thus obtained concave-shaped part by using a brazing material or the like. The first corner 11, the first side 13 and the second side 15 may be located on the cutting part 33 in the non-limiting embodiment illustrated in FIG. 1.

For example, a material having relatively high hardness, such as PCD and cBN, may be used as a material of the cutting part 33. For example, cemented carbide, cermet or ceramics may be used as a material of the main body 31. This may contribute to enhanced durability of the insert 1 against cutting load, while making it possible to inexpensively manufacture the insert 1. The hardness of the main body 31 and the cutting part 33 may be evaluated by measuring Vickers hardness of their respective parts.

The insert 1 may be formed only by the cutting part 33 and the main body 31. Alternatively, the insert 1 may include, in addition to the cutting part 33 and the main body 31, a coating layer (not illustrated) for covering surfaces of these members. The coating layer may cover the whole or part of a surface of a base member formed by the cutting part 33 and the main body 31.

Examples of material of the coating layer may include aluminum oxide (alumina), and carbides, nitrides, oxides, carbonates, nitrogen oxides, carbonitrides and carboxynitrides of titanium. The coating layer may include only one or a plurality of the above-mentioned materials.

The coating layer may be formed by only one layer, or alternatively may be a structure in which a plurality of layers are laminated one upon another. The material of the coating layer is not limited to these materials. The coating layer can be located on the base member by using chemical vapor deposition (CVD) method or physical vapor deposition (PVD) method.

The insert 1 may include a through hole 35 as in the non-limiting embodiment illustrated in FIG. 1. The through hole 35 may be formed from the first surface 3 to the second surface 5, and may open into these surfaces. The through hole 35 may be extended along the central axis O1 passing through a center of the first surface 3 and a center of the second surface 5. The through hole 35 may be usable for attaching a fixing screw or clamping member when causing the insert 1 to be held by the holder. There is no problem even if the through hole 35 opens into regions in the third surface 7 which are located on opposite sides.

<Cutting Tools>

The cutting tool 101 in non-limiting embodiments may be described below with reference to the drawings.

Figure 12:
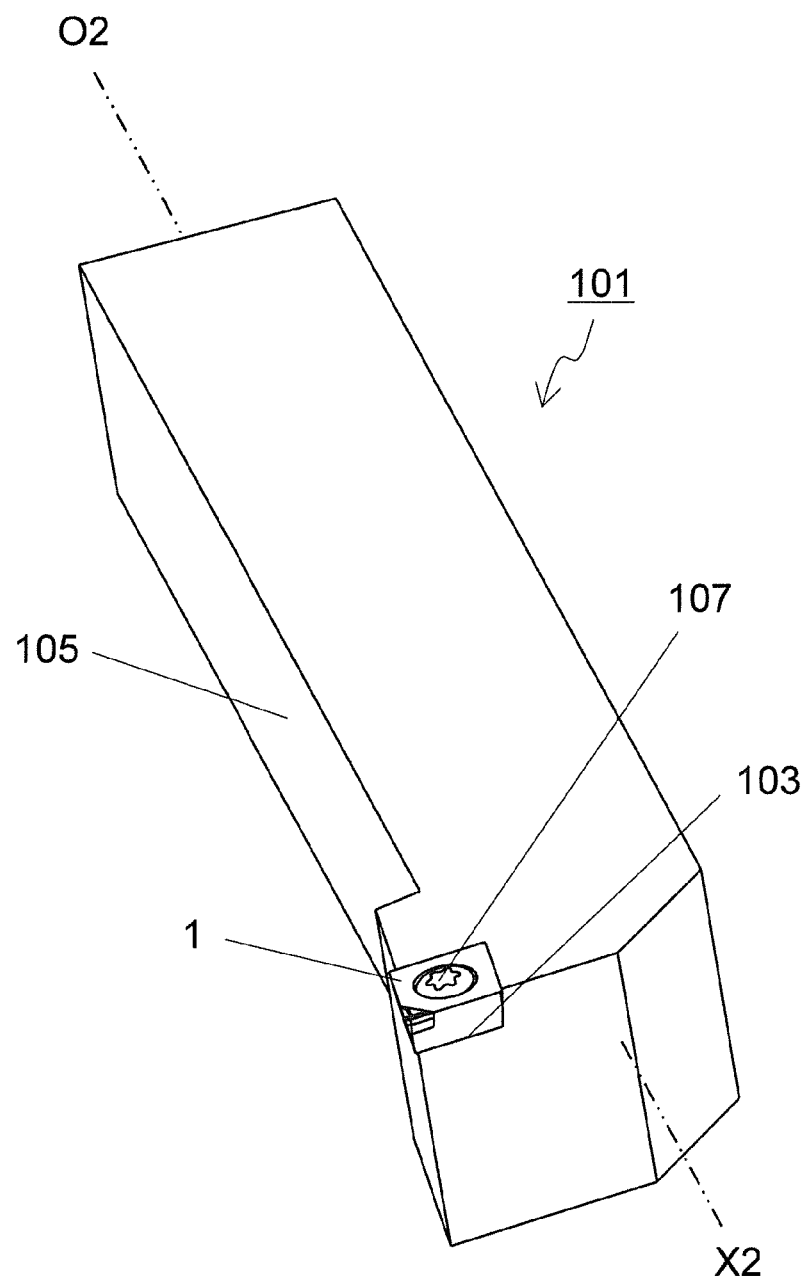
FIG. 12 is a perspective view illustrating a cutting tool in the non-limiting embodiments of the present disclosure.
Figure 13:
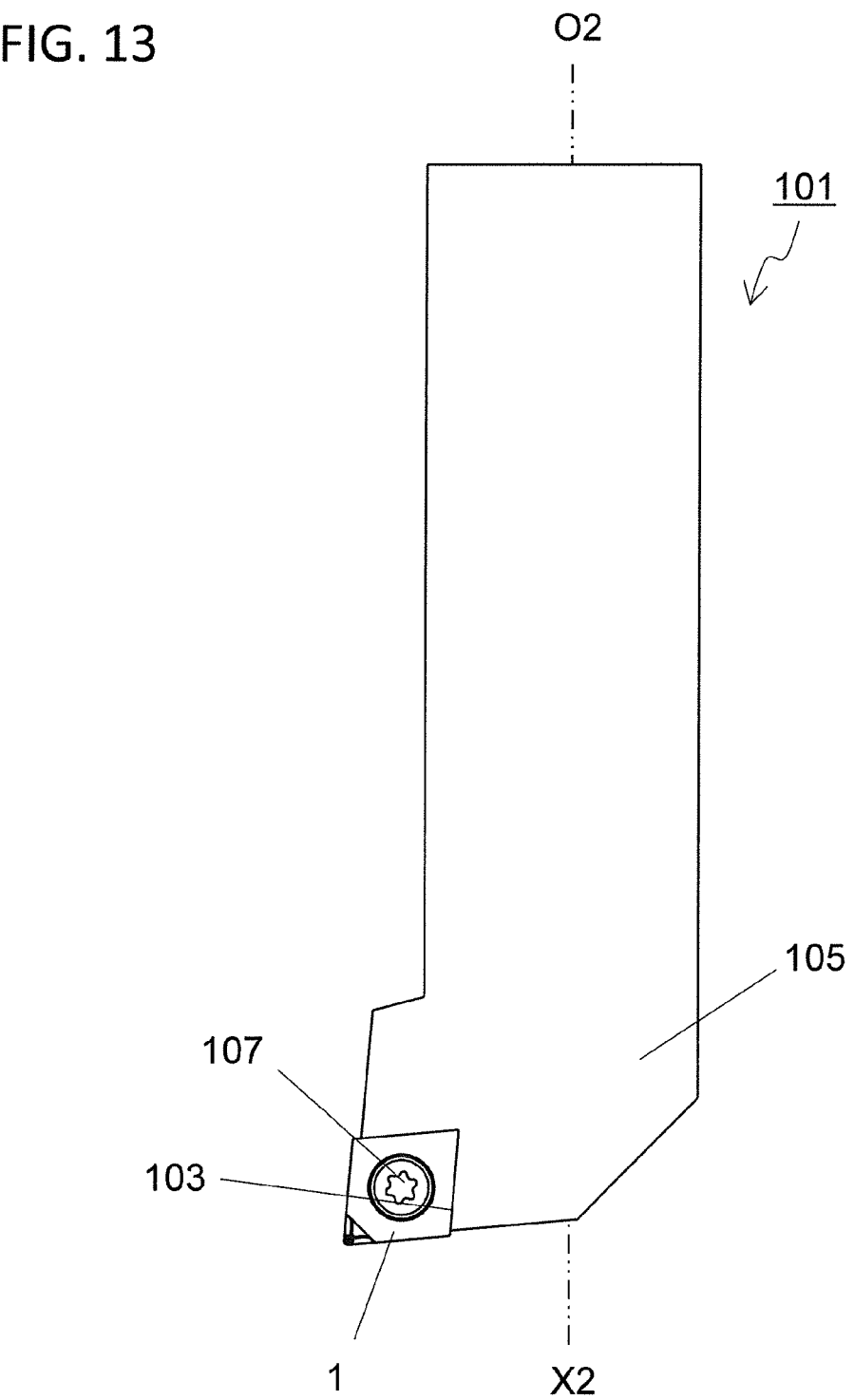
FIG. 13 is a plan view of the cutting tool illustrated in FIG. 12.

As illustrated in FIGS. 12 and 13, the cutting tool 101 may include a holder 105 and the insert in a non-limiting embodiment. The holder 105 may have a bar shape extended from a first end toward a second end, and may include a pocket 103 (insert pocket) on a side of the first end. The insert may be located in the pocket 103. The insert 1 may be attached so that at least a part of the cutting edge is protruded from the first end of the holder 105.

The holder 105 may have a long narrow bar shape extended along an axis O2. The single pocket 103 may be disposed on a side of the first end of the holder 105. The pocket 103 may be a part that permits attachment of the insert 1. The pocket 103 may open into an end surface on a side of the first end in the holder 105. If the pocket 103 opens into a side surface of the holder 105, it may be easy to carry out attachment of the insert 1. The pocket 103 may include a seating surface parallel to a lower surface of the holder 105, and a constraining side surface inclined relative to the seating surface.

The insert 1 may be located in the pocket 103. The second surface of the insert 1 may be in direct contact with the pocket 103. Alternatively, a sheet may be disposed between the insert 1 and the pocket 103.

The insert 1 may be attached to the holder 105 so that a portion of the insert 1 used as the cutting edge is protruded outward from the holder 105. The insert 1 may be attached to the holder 105 by a fixing screw 107. Specifically, the insert 1 may be attached to the holder 105 by inserting the fixing screw 107 into a screw hole of the insert 1 and by inserting a front end of the fixing screw 107 into a screw hole formed in the pocket 103 so as to establish thread engagement between screw parts.

For example, steel or cast iron may be usable for the holder 105. Particularly, if steel is used for the holder 103, the holder 103 may have enhanced toughness.

The non-limiting embodiments may be illustrated and described as the cutting tools for use in so-called turning process. Examples of the turning process may include internal machining, external machining and grooving process. The cutting tools are not limited to ones which are used for the turning process. For example, the inserts in the non-limiting embodiments may be used for a cutting tool for use in a milling process.

<Method for Manufacturing Machined Product>

A method for manufacturing a machined product in non-limiting embodiments may be described below with reference to the drawings.

The machined product may be manufacturable by carrying out a cutting process of a workpiece 201. The method for manufacturing the machined product in the non-limiting embodiments may include the following steps:

(1) rotating the workpiece 201;

(2) bringing a ridgeline in the cutting tool 101 represented by the non-limiting embodiments into contact with the workpiece 201 being rotated; and (3) moving the cutting tool 101 away from the workpiece 201.

Figure 14:
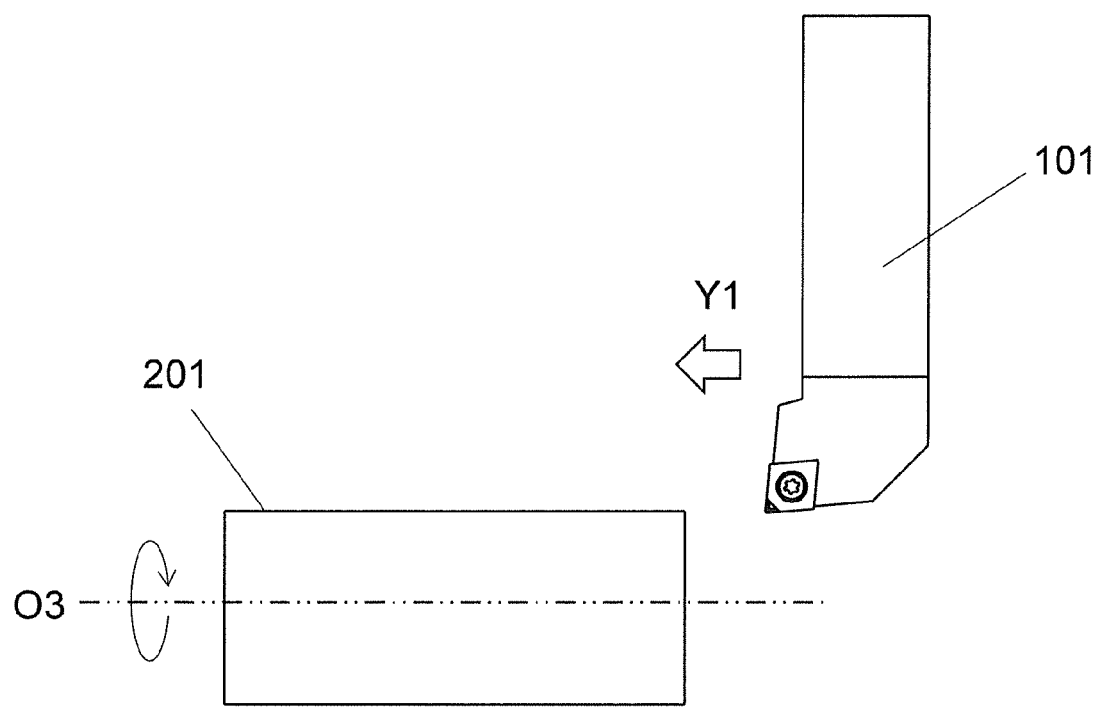
FIG. 14 is a schematic diagram illustrating one of steps in a method for manufacturing a machined product in non-limiting embodiments of the present disclosure.
Figure 15:
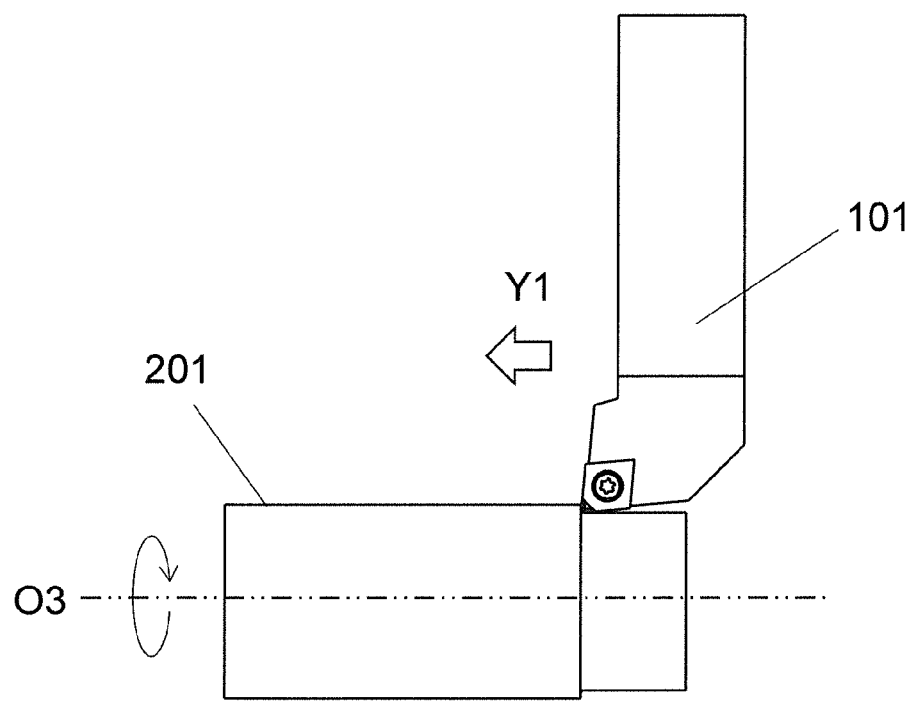
FIG. 15 is a schematic diagram illustrating one of the steps in the method for manufacturing a machined product in the non-limiting embodiments of the present disclosure.

More specifically, the workpiece 201 may be firstly rotated around an axis O3, and the cutting tool 101 may be relatively brought near the workpiece 201 as illustrated in FIG. 14. The workpiece 201 may be then cut out by bringing the ridgeline (the cutting edge) in the cutting tool 101 into contact with the workpiece 201 as illustrated in FIG. 15.

Figure 16:
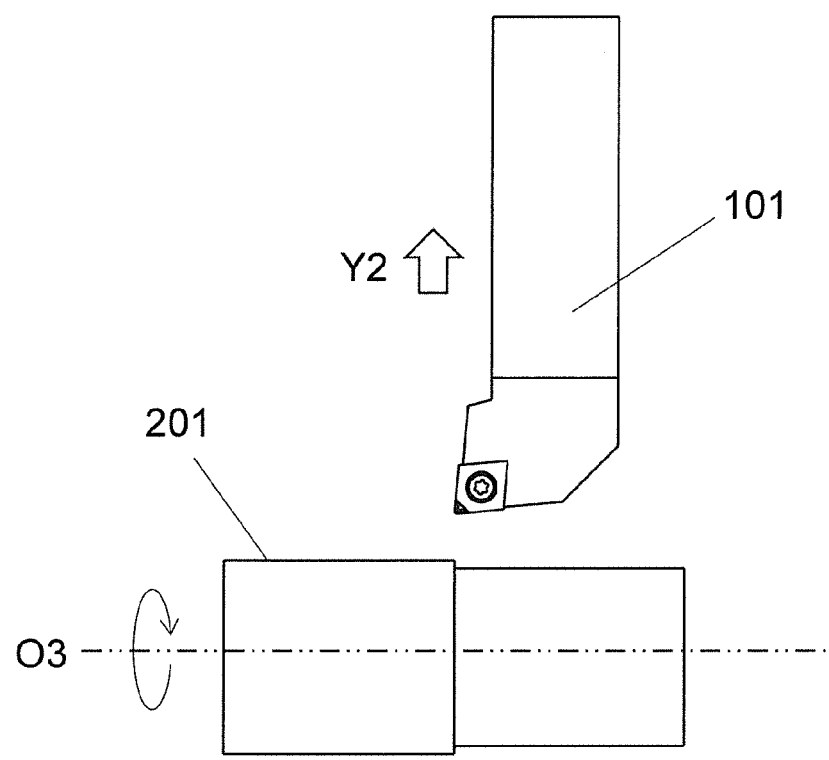
FIG. 16 is a schematic diagram illustrating one of the steps in the method for manufacturing a machined product in the non-limiting embodiments of the present disclosure.

Thereafter, the cutting tool 101 may be relatively moved away from the workpiece 201 as illustrated in FIG. 16.

In the non-limiting embodiments, the cutting tool 101 may be brought near the workpiece 201 by moving the cutting tool 101 in a Y1 direction in a state where the axis O3 is fixed and the workpiece 201 is rotated. In FIG. 15, the workpiece 201 may be cut out by bringing the cutting edge in the insert into contact with the workpiece 201 being rotated. In FIG. 16, the cutting tool 101 may be moved away by moving the cutting tool 101 in a Y2 direction in a state where the workpiece 201 is rotated.

During the cutting process with the manufacturing method in the non-limiting embodiments, the cutting tool 101 may be brought into contact with the workpiece 201, or the cutting tool 101 may be moved away from the workpiece 201 by moving the cutting tool 101 in each of the above steps. However, it is not intended to limit to this embodiments.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERAL 1 insert
3 first surface
5 second surface
7 third surface
9 cutting edge
9a corner cutting edge
9b first cutting edge
9c second cutting edge
11 first corner
13 first side
15 second side
17 first inclined surface
19 second inclined surface
21 third inclined surface
23 fourth inclined surface
25 protruded part
27 front end surface
29 land surface
31 main body
33 cutting part
35 through hole
37 seventh inclined surface
38 eighth inclined surface
41 tenth inclined surface
101 cutting tool
103 pocket
105 holder
107 fixing screw
201 workpiece

The invention claimed is:
1. A cutting insert, comprising:
a first surface;
a second surface located on a side opposite to the first surface;
a third surface located between the first surface and the second surface;
a cutting edge located on an intersection of the first surface and the third surface;
a central axis passing through a center of the first surface and a center of the second surface; and
an imaginary plane that is located between the first surface and the second surface and is orthogonal to the central axis, wherein
the first surface comprises
a corner,
a first side extended from the corner,
a first inclined surface that is inclined downwardly at a first inclination angle as going away from the corner,
a second inclined surface that is located further inside the first surface than the first inclined surface and is inclined downwardly,
a third inclined surface that is inclined downwardly at a third inclination angle as going away from the first side,
a fourth inclined surface that is located further inside the first surface than the third inclined surface and is inclined downwardly, and
a protruded part which is located further inside the first surface than the second inclined surface and the fourth inclined surface, which comprises
a fifth inclined surface inclined upwardly at a fifth inclination angle as going away from the corner, and the fifth inclined surface is directly connected to the second inclined surface, and
a sixth inclined surface inclined upwardly at a sixth inclination angle, and
the sixth inclined surface is directly connected to the fourth inclined surface,
the second inclination angle is larger than the first inclination angle,
the fourth inclination angle is larger than the third inclination angle,
the fifth inclination angle is smaller than the second inclination angle in a cross section that is orthogonal to the imaginary plane and along a bisector of the corner,
the sixth inclination angle is larger than the third inclination angle in a cross section orthogonal to the first side,
the fifth inclination angle is smaller than the first inclination angle in the cross section that is orthogonal to the imaginary plane and along the bisector, and
the sixth inclination angle is larger than the fourth inclination angle in the cross section orthogonal to the first side.

2. The cutting insert according to claim 1, wherein a length of the second inclined surface is smaller than a length of the first inclined surface on the bisector in the plan view of the first surface.

3. The cutting insert according to claim 1, wherein the front end surface is parallel to the imaginary plane in a cross section orthogonal to the bisector.

4. The cutting insert according to claim 1, wherein the corner is located further away from the imaginary plane than the front end surface.

5. The cutting insert according to claim 1, wherein
a length of the front end surface is larger than a length of the top surface on the bisector in a plan view of the first surface.

6. A cutting tool, comprising:
a holder having a bar shape extended from a first end toward a second end and comprising a pocket located on a side of the first end; and
the cutting insert according to claim 1, the cutting insert being located in the pocket.

7. A method for manufacturing a machined product, comprising:
rotating a workpiece;
bringing the cutting tool according to claim 6 into contact with the workpiece being rotated; and
moving the cutting tool away from the workpiece.

8. The cutting insert according to claim 1, wherein the protruded part comprises a front end surface having a flat shape, that is located on the bisector and inclined so as to separate from the imaginary plane as going away from the corner,
the protruded part further comprises a top surface which is located further away from the corner than the front end surface, connects to the front end surface and is parallel to the imaginary plane, and
the front end surface comprises a region whose width in a direction orthogonal to the bisector increases as going away from the corner in a plan view of the first surface.

* * * * *